(12) United States Patent
Sargologos

(10) Patent No.: US 7,627,657 B1
(45) Date of Patent: Dec. 1, 2009

(54) METHOD OF UPGRADING A COMPUTER SYSTEM FROM A NARROWBAND COMMUNICATION LINK TO A BROADBAND COMMUNICATION LINK

(75) Inventor: Nicholas J. Sargologos, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 776 days.

(21) Appl. No.: 09/644,401

(22) Filed: Aug. 23, 2000

(51) Int. Cl.
*G06F 15/177* (2006.01)
(52) U.S. Cl. .................. 709/221; 709/220; 709/222
(58) Field of Classification Search ............. 709/221, 709/222; 370/260
See application file for complete search history.

(56) References Cited

U.S. PATENT DOCUMENTS

| | | | |
|---|---|---|---|
| 6,028,867 A | 2/2000 | Rawson et al. ............. 370/463 |
| 6,075,784 A * | 6/2000 | Frankel et al. ............. 370/356 |
| 6,081,517 A | 6/2000 | Liu et al. .................... 370/352 |
| 6,262,978 B1 * | 7/2001 | Bruno et al. ................ 370/260 |
| 6,404,861 B1 * | 6/2002 | Cohen et al. ............. 379/93.01 |
| 6,463,079 B2 * | 10/2002 | Sundaresan et al. ......... 370/468 |
| 6,643,266 B1 * | 11/2003 | Pugaczewski ............... 370/249 |
| 2001/0044835 A1 * | 11/2001 | Schober et al. ............. 709/217 |

* cited by examiner

*Primary Examiner*—Vivek Srivastava
*Assistant Examiner*—Adnan Mirza
(74) *Attorney, Agent, or Firm*—Haynes and Boone, LLP

(57) ABSTRACT

A method of upgrading a computer system from a narrowband communication link (such as an analog or V.90 modem) to a broadband communication link (such as a DSL modem) is disclosed. The method includes performing a telephone line capability qualification operating over the narrowband communication link through the telephone line to determine the capability of the telephone line to support broadband communication, offering to enable a broadband communication link upon confirmation that the telephone line is capable of supporting broadband communication, and enabling the broadband communication link.

22 Claims, 7 Drawing Sheets

100 US 7,627,657 B1

METHOD OF UPGRADING A COMPUTER SYSTEM FROM A NARROWBAND COMMUNICATION LINK TO A BROADBAND COMMUNICATION LINK

BACKGROUND

This disclosure relates generally to the provision of broadband communication by a computer system and more particularly to the integrated and automated upgrade of a computer system from a narrowband communication link to a broadband communication link.

DESCRIPTION OF THE RELATED ART

Access to the Internet is becoming increasingly important to consumers in their decisions to purchase a particular brand of computer. Most Internet capable computers are equipped with a narrowband communication link, such as an analog or V.90 modem that accesses the Internet through a consumer's existing telephone lines. These narrowband communication links offer transmission speeds up to 56 Kilobits per second (Kbps).

Broadband communication over existing telephone lines can achieve data rates of up to 6.1 Megabits per second (Mbps). In addition, broadband communication technology allows consumers to communicate via a telephone line by transmitting analog data (such as voice communication) at the same time as transmitting digital data (such as accessing the Internet).

Computer manufacturers and suppliers desire to provide broadband communication capability to their consumers as a distinguishing feature of their product but have been unable to do so reliably because they are unable to guarantee broadband capability to all consumers. Broadband communication technology is not available to all consumers due to various reasons including the technical condition of the consumer's existing telephone lines, the availability of broadband service from the telephone company in the consumer's area, and the capabilities of the computer system. A consumer must live within a certain proximity to the telephone company's central office and have no physical impediments on the existing telephone lines between the consumer's connection and the telephone company. The consumer must live in an area where the telephone company offers broadband service. The consumer must have a computer capable of broadband communication. The method of determining whether the telephone lines are broadband capable is often unreliable and sometimes requires the consumer to enable the service first to determine broadband capability.

A consumer must perform a time consuming, technically challenging process to enable broadband service on his computer system. The consumer must contact the telephone company to make a broadband connection to the consumer's telephone line in the telephone company's central office; contact a broadband service provider and enroll in their service; load and configure the service provider's software; contact an Internet Service Provider (ISP) and enroll in their service; load and configure the ISP's software; and, if not already available, install a broadband modem in the computer system. The process is technically overwhelming for the average consumer and often leads to numerous telephone calls to the computer manufacturer for technical help. In many cases a "truck roll" is needed, that is, a technician must be sent to aid the consumer in installing the broadband communication link, and in configuring and enabling the various software packages.

After following the necessary steps to enable broadband service, the consumer may discover that he is unable to receive broadband service in his area. This happens when unreliable information is used to determine the conditions of the telephone lines connecting the consumer to the telephone company. If broadband service capability is tied to the sale of a computer system, the dissatisfied consumer will often return the computer system to the computer manufacturer or supplier for a refund, resulting in great reduction in revenue due to the loss of sales and the inability to resell the computer system as new merchandise.

The current methods of upgrading a consumer's computer from a narrowband communication link to a broadband communication line are technically overwhelming and time consuming for the consumer. Due to the unavailability of broadband communication technology to some consumers, computer manufacturers have not desired to link the promise of broadband communication to their computer sales. Computer manufacturers and suppliers have been reluctant to ship new computers with broadband communication capability due to the risks and complications of broadband communication technology.

Broadband communication has not been gaining widespread acceptance by consumers. A method of upgrading the narrowband communication link to a broadband communication link is needed that is less costly, more user friendly and more reliable. The method additionally needs to enable computer manufacturers and suppliers to provide broadband communication capability as a distinguishing feature of their product with low risk of returned merchandise due to dissatisfied customers.

SUMMARY

The present disclosure provides a method of upgrading a computer from a narrowband communication link to a broadband communication link as an integrated and automated post sale upgrade and conversion process that decouples the sale of a computer from the issues of broadband availability. The present disclosure can be implemented over an existing narrowband communication link, not requiring a technician's aid or telephone calls from a consumer to the computer manufacturer. The integrated upgrade and automatic configuration process reduces the number of dissatisfied customers and the cost of returned merchandise due to technical reasons beyond the computer manufacturer's control while at the same time providing a distinguishing feature for the sale of a new computer system.

BRIEF DESCRIPTION OF THE DRAWINGS

The present disclosure may be better understood, and its numerous objects, features and advantages made apparent to those skilled in the art by referencing the accompanying drawings.

The use of the same reference symbols in different drawings indicates similar or identical items.

DESCRIPTION OF THE PREFERRED EMBODIMENT (S)

Figure 1:
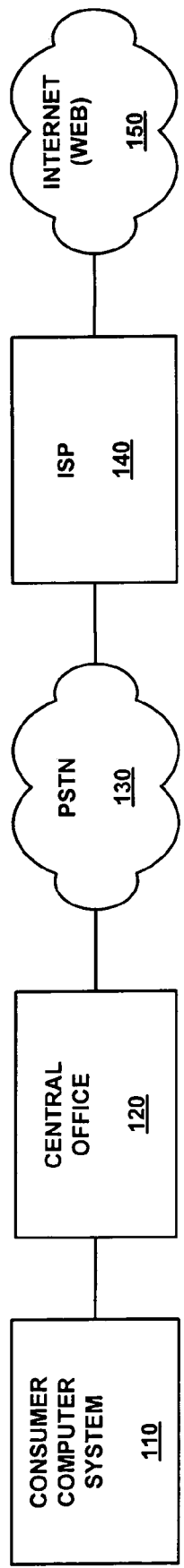
FIG. 1 shows the environment in which a consumer connects to the Internet from his computer system in his home or small business.

FIG. 1 shows the environment in which a consumer connects to the Internet from his computer system in his home or small business. Digital data from computer system 110 in a consumer's home is converted into an analog signal by a modem (not shown) connected to computer system 110. The analog signal is transmitted over telephone lines to the telephone company's central office 120. Telephone wires in most communities are copper wires that are wound around each other, also known as twisted pair. Traditional telephone service was created for the exchange of voice information between telephone users via analog signals and therefore the connection between a consumer's home and the central office is typically equipped for analog signals.

A line card (not shown) in central office 120 receives the analog signal and converts the analog signal back to digital data. Central office 120 then transmits the digital data over public switched telephone network (PSTN) 130 to the consumer's chosen Internet Service Provider (ISP) 140. ISP 140 then transmits the digital data to Internet 150 (also known as the world wide web). Digital data from Internet 150 follows the same path back to the consumer, being converted into an analog signal by a line card (not shown) in central office 120, sent over telephone lines and converted back into digital data by the computer's modem (not shown). In this way, the consumer utilizes telephone lines connected to his home to access Internet 150.

Although this environment provides for a consumer and his home telephone lines, the environment is similar for any consumer, including small businesses that have an analog connection to the central office 120. Most large businesses, corporations and ISPs have digital connections directly to the telephone company's central office. Typically, the only analog portion of the telephone network is the telephone line that connects the consumer's site to the telephone company's central office switch, leaving the consumer with only a narrowband communication link capability.

Due to the requirement of changing the digital data from the computer system first into analog data prior to transmitting the data over the telephone lines and then back into digital data at the central office, the analog transmission to and from the consumers home is a bandwidth bottleneck, limiting transmission speeds to 33.6 Kilobits per second (Kbps).

Traditional modem standards assume that both ends of a modem session have an analog connection to the public switched telephone network. The V.90 standard improves transmission speeds by assuming that one end of the transmission has a pure-digital connection to the telephone network (such as the ISP and large corporation's connection) and takes advantage of the high speed digital connection. The V.90 technology allows modems to receive data at up to 56 Kbps over the PSTN. V.90 digitally encodes downstream data (data sent to the consumer's computer) instead of converting it to analog as traditional modems do. The data transfer is asymmetrical, that is, upstream data (data sent from the consumer's computer which are mostly keystroke and mouse commands and require less bandwidth) continue to flow at the conventional rates of up to 33.6 Kbps. This enables the consumer to more efficiently download Internet pages with sound, video and other large files. However, V.90 is still considered a narrowband communication link.

Analog transmission only uses a small portion of the available amount of information that could be transmitted over copper wires, resulting in the maximum amount of data transmitted using ordinary modems to be about 56 Kbps.

DSL (Digital Subscriber Line), a broadband communication link, assumes digital data does not require conversion to and from an analog signal. Digital data is transmitted to and from a consumer's computer directly as digital data, which allows the telephone company to use a much wider bandwidth for transmission over the existing copper wires. A DSL line is capable of carrying both digital data and analog voice signals allowing the consumer to use his telephone and computer on the same line and at the same time. The digital data part of the line is continuously connected. DSL offers data at rates up to 6.1 Megabits per second (Mbps), enabling continuous transmission of motion video, audio, and 3-D effects. More typically, individual connections provide from 1.544 Mbps to 512 Kbps downstream and about 128 Kbps upstream.

Figure 2:
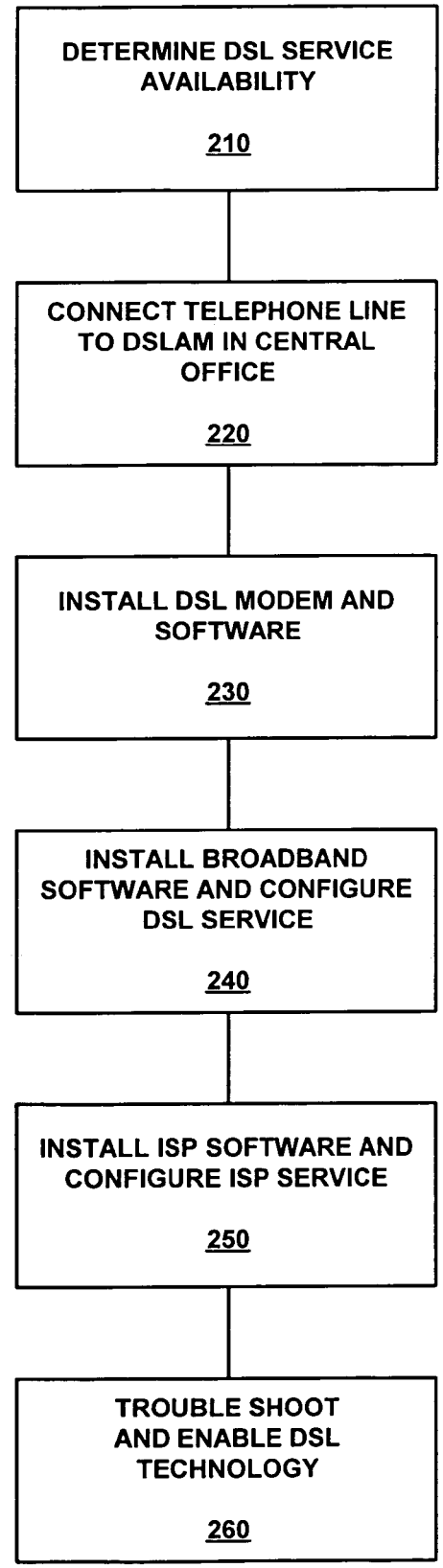
FIG. 2 shows the prior art steps that a consumer typically performs in order to enable broadband technology on his computer system.

FIG. 2 shows the prior art steps that a consumer typically performs in order to enable broadband technology on his computer system.

In step 210, the consumer must verify that his telephone lines are capable of broadband communication, such as DSL service. Broadband service is not available to all consumers. First of all, the telephone company's central office must be specially equipped to provide broadband service. In addition, a consumer's home or business must be within a certain proximity of a telephone company's central office that offers DSL service otherwise the consumer will not be able to use DSL. This is due to degradation in the transmitted signal the further the consumer's home is from the central office. Moreover, other barriers may exist due to the condition of the telephone line or other devices attached to the telephone line between the consumer's home and the central office, such as a PBX or a DLC (Digital Loop Carrier).

The verification process to determine the quality of the telephone lines has been very unreliable. Two typical verification processes include a mapping algorithm and a search of the telephone company records. The mapping algorithm checks the consumer's address and telephone number, determines whether the applicable central office is equipped to offer DSL service, and determines the distance from the consumer's home to the central office. The other process involves checking the telephone company's records to determine telephone line characteristics. The first method has been shown to be only 75% accurate and the second only 86%. The mapping algorithm does not take into account various impediments that may be on the line. The telephone company's records in some areas are not always helpful since many records were kept with no appreciation of the particular requirements of DSL technology.

A more reliable method of determining the quality of the consumer's telephone line involves having a consumer make a modem call to a DSL qualification service (there are many commercially available qualification services and products, such as the Telcordia™ DSL Loop Qualification Service) which tests the DSL capability of the consumer's telephone line by sending test patterns across the lines to the consumer's analog or V.90 modem and measuring the results. This method has been shown to be highly accurate in determining the quality of the consumers telephone line. However, additional checking must be performed to determine whether the telephone company and service providers provide DSL service in the consumers area.

Due to the unreliability of the existing DSL capability qualification process and the limitations imposed by the technology, computer manufacturers and suppliers have been reluctant to provide or promise consumers DSL service linked with the purchase of a new computer. To avoid dissatisfied customers, computer manufacturers and suppliers have simply not offered DSL service with the sale of a new computer.

In step 220, once the consumer has verified that his telephone lines are capable of receiving broadband service, the consumer must contact the telephone company to provide the physical connection required for DSL service. To interconnect multiple DSL consumers to the high-speed digital network, the telephone company uses a Digital Subscriber Line Access Multiplexer (DSLAM), also referred to as a Digital Service Local Area Multiplexer. The consumer's telephone line is already attached to a line card in the central office for transferring analog signals. The telephone company makes another connection from the telephone line to the DSLAM, providing for the transfer of digital data. The DSLAM multiplexes individual consumers DSL connections for data transmission across the PSTN at gigabit data rates. For transmissions to the consumer's computer, a DSLAM demultiplexes the signals and forwards them to the appropriate individual consumer DSL connection. This connection to the digital network is not automatic; the consumer must request and pay for the telephone company to make the additional connection.

In step 230, the consumer must purchase, install, and configure a DSL modem and the appropriate software to his computer system. In step 240, the consumer must choose and call a DSL service provider to order service and receive, install, and configure the broadband communication service software. Next, in step 250, the consumer must choose and call an ISP to provide Internet services, as well as receive, install and configure the ISP service software. Each of these step 230, 240 and 250 require considerable time and expertise from the consumer and may require one or more "truck rolls," that is, one or more technicians to go to the consumer's home and install the modem, install all software and configure the computer system.

In step 260, the consumer must check for proper installation and operation of the DSL service and technology. If a problem is detected, the consumer is faced with a tremendous task of locating the cause of the problem. There are many different software and hardware components, all operating together, any of which may be the cause of the problem. The majority of consumers do not make the switch from a narrowband communication link to a broadband communication link due to the numerous and difficult steps required to enable the broadband technology.

Figure 3:
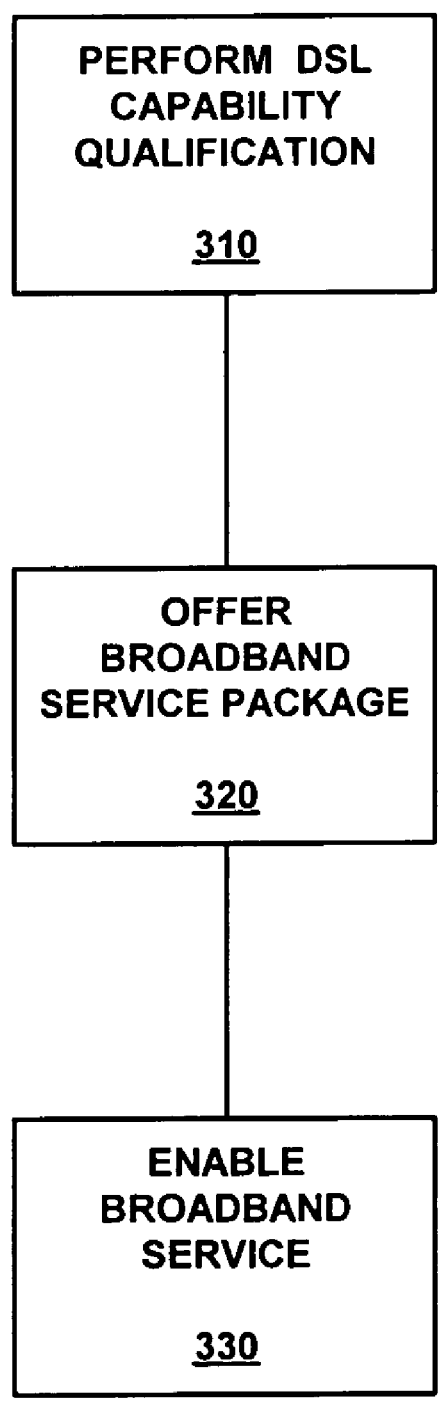
FIG. 3 shows an integrated and automated method of upgrading a computer system from a narrowband communication link to a broadband communication link.

FIG. 3 shows a method of upgrading a computer system from a narrowband communication link to a broadband communication link according to the present disclosure. In this method, a software application or set of applications automatically upgrades the consumer's computer system with very little interaction from the consumer. In step 310, a DSL capability qualification is performed over the existing telephone connection between the consumer and the telephone company, utilizing information from the consumer, and utilizing the consumer's existing analog modem. If the DSL capability qualification receives positive results, the consumer is offered a broadband service package in step 320. In step 330, the broadband service package is automatically installed, configured and enabled, requiring little, if any, input by the consumer. Each of these steps requires little time and effort from the consumer.

Figure 4:
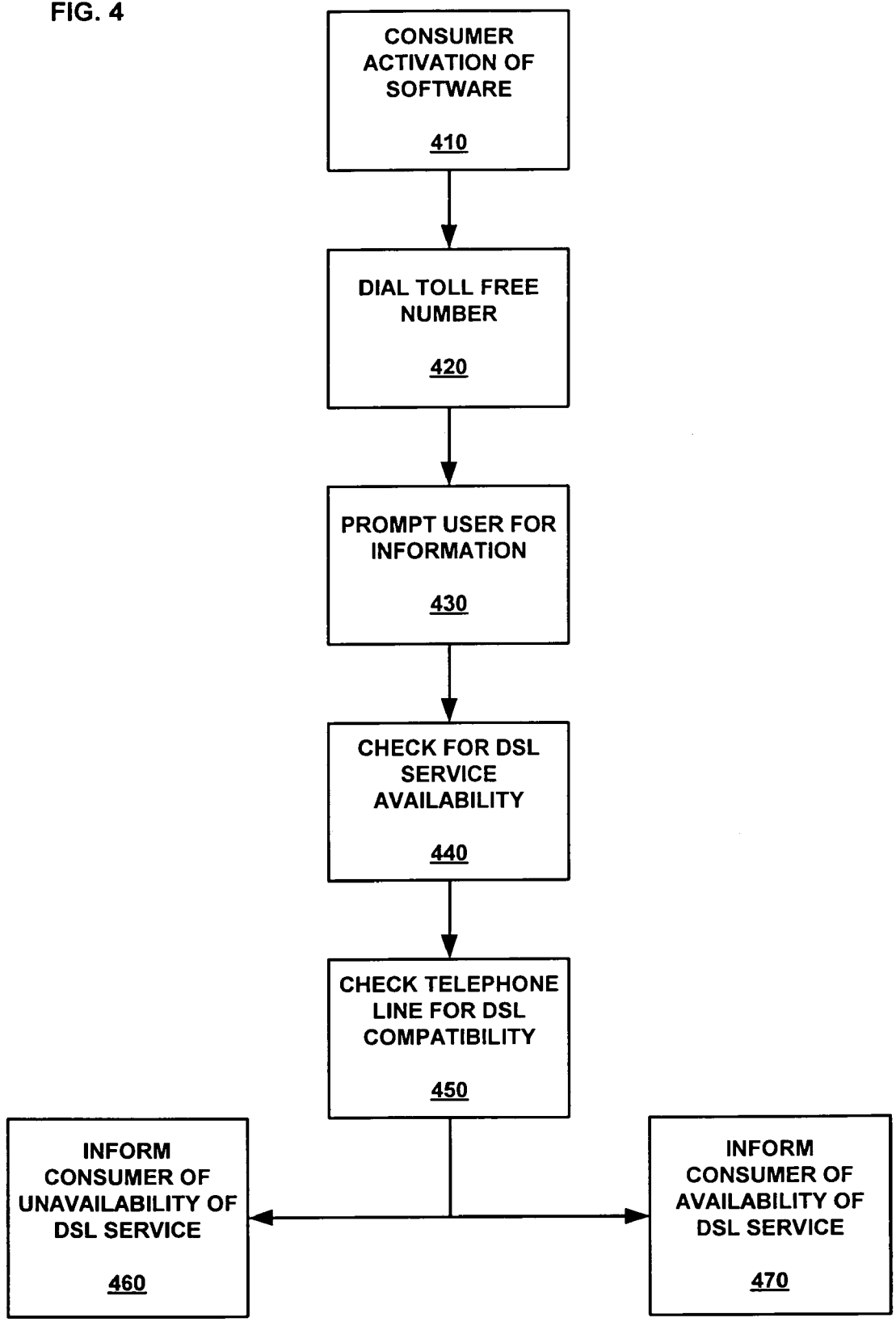
FIG. 4 shows the steps of performing a DSL capability qualification of the consumer's broadband capability according to one embodiment.

FIG. 4 shows the steps of performing a DSL capability qualification of the consumer's broadband capability according to one embodiment of the present disclosure. In step 410, the consumer activates an icon, tool or application on his computer desktop. This initiates software that automatically, using the consumer's existing narrowband communication link, such as an analog or V.90 modem, dials a local or toll free number that connects to a capability qualification service, step 420. In step 430, the consumer is prompted for information regarding his address and telephone number, and other data. In step 440, the capability qualification service then determines if the telephone company offers broadband service in the consumer's area and if the consumer lives within the coverage area of a specific service provider that has a service agreement with the computer manufacturer or supplier. In step 450, the telephone line qualification check software tests the telephone line for broadband compatibility by sending test patterns back and forth to the consumer's analog or V.90 modem. The qualification check software tests for impediments on the telephone lines and checks for the quality of the telephone line due to the proximity of the consumer's location to the central office. The consumer's telephone line does not have to be connected to the DSLAM for the qualification check software to operate; the software uses the existing analog connection to perform the qualification check. The qualification check is highly accurate and greatly reduces the chances that the consumer will receive a "false positive."

If either of the above tests fail, that is, if either step 440 or step 450 fails, the consumer information is kept until a later date, in anticipation of improved line conditions or the extension of the service provider's coverage area, step 460. In addition, the software provides the consumer with a message indicating that DSL service is not available to the consumer at the present time from the specific service provider.

If both tests are met, that is, the consumer's line is broadband compatible, broadband service is offered in the consumer's area by the telephone company, and the consumer lives in an area covered by the specific service provider, in step 470 the software provides the consumer with a message indicating that DSL service is available to the consumer at the present time from the specific service provider and consumer information is stored.

Figure 5:
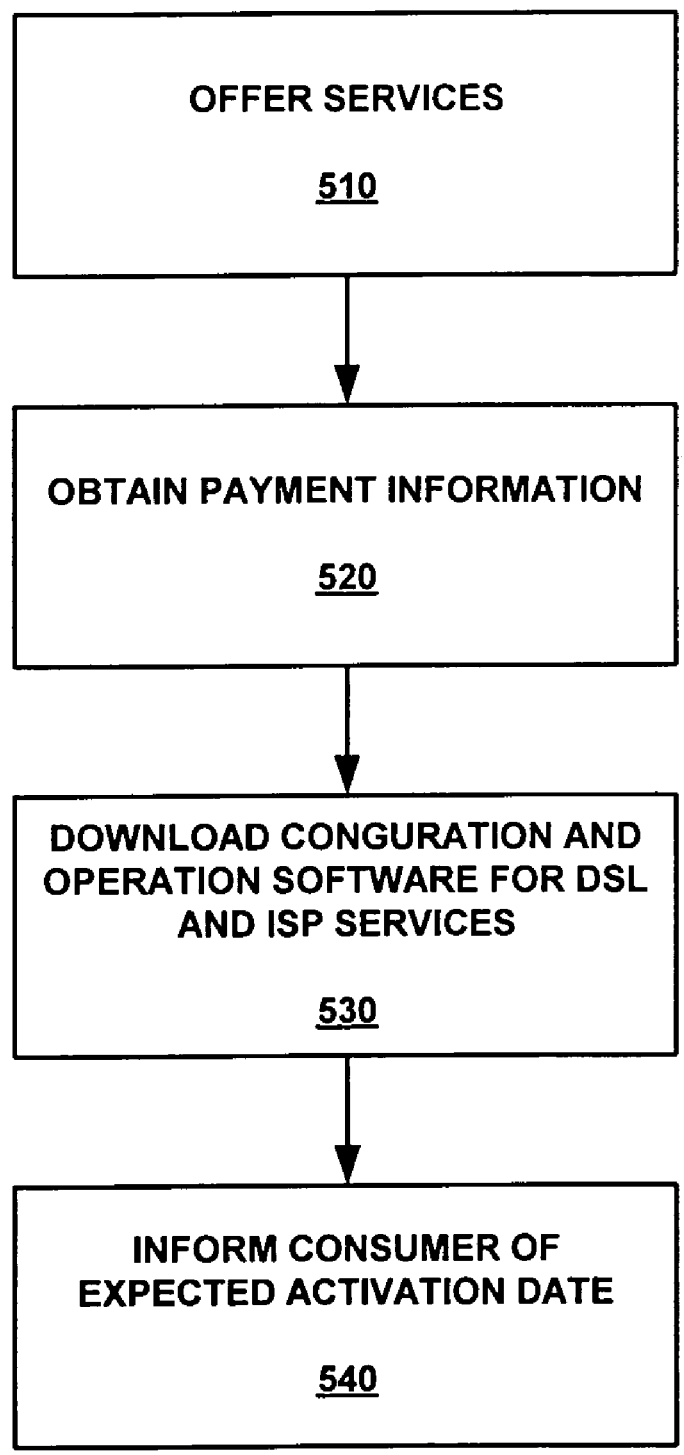
FIG. 5 shows the steps of offering a broadband service package to a consumer according to one embodiment.

FIG. 5 shows the steps of offering a broadband service package to a consumer according to one embodiment. In step 510, the software provides the consumer with a listing of the available service, prices, and options. The offered services include the provision of a broadband communication link technology, such as a DSL modem, broadband communication service from the service provider and ISP service from a specific ISP service provider. The modem, broadband service, ISP service and all associated software has been previously tested for compatibility and ease of use for the consumer. The DSL modem typically attaches to the consumer's computer via a USB connector and can be simply installed by the consumer. In this way, the consumer is provided with a complete package, including DSL modem, DSL service provider and software, and ISP and software, all from one source, and all known to be compatible.

In step 520, if the consumer accepts the service, the software prompts him for payment information, such as a credit card number or other payment package.

In step 530, the required software for the service provider and ISP services are automatically downloaded through the consumer's analog or V.90 modem to be enabled when the service is ready to be activated. This software includes the configuration and operation software applications.

In step 540, the software provides the consumer with information regarding shipment of the DSL modem and estimated date for activation.

Figure 6:
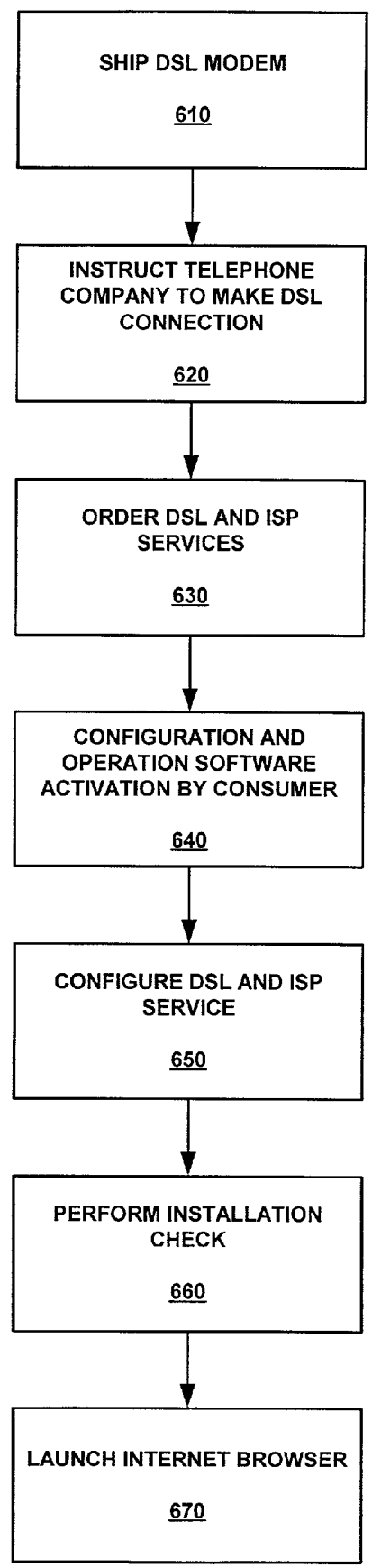
FIG. 6 shows the steps of enabling broadband service according to one embodiment.

FIG. 6 shows the steps of enabling broadband service according to one embodiment. All necessary steps are coordinated for the consumer, including the shipping of the DSL modem in step 610, the instructing the telephone company to connect the consumer's telephone line to the DSLAM in the central office in step 620, the enabling of the DSL service and the enabling of the ISP service in step 630 (the services must be ordered, initialized and login names and passwords obtained). The consumer may pay for each of the services individually or more preferably, pay the computer manufacturer who in turn pays each of the individual accounts. In addition, if problems occur, the consumer has one contact point that will troubleshoot the consumer's system for him.

In step 640, once the central office connection is made, the DSL and ISP service is ordered, and the DSL modem is delivered, the consumer is notified to connect the DSL modem and to activate the configuration software, typically by clicking on an icon on his desktop. The configuration software automatically configures the consumer's computer system for DSL and ISP service in step 650 and checks that everything is in proper working order by initiating a self diagnostic program to verify correct operation of the broadband communication link and technology in step 660. The software then launches the Internet browser for the consumer in step 670. The DSL service is now configured and operational without requiring the consumer to reboot or reconfigure his computer system and without having to make a telephone call to the computer manufacturer or requiring a truck roll. The consumer pays for his broadband communication link in one or more unified payments, covering the costs of the telephone company's connection, the DSL modem, the DSL service provider fees and the ISP fees.

Figure 7:
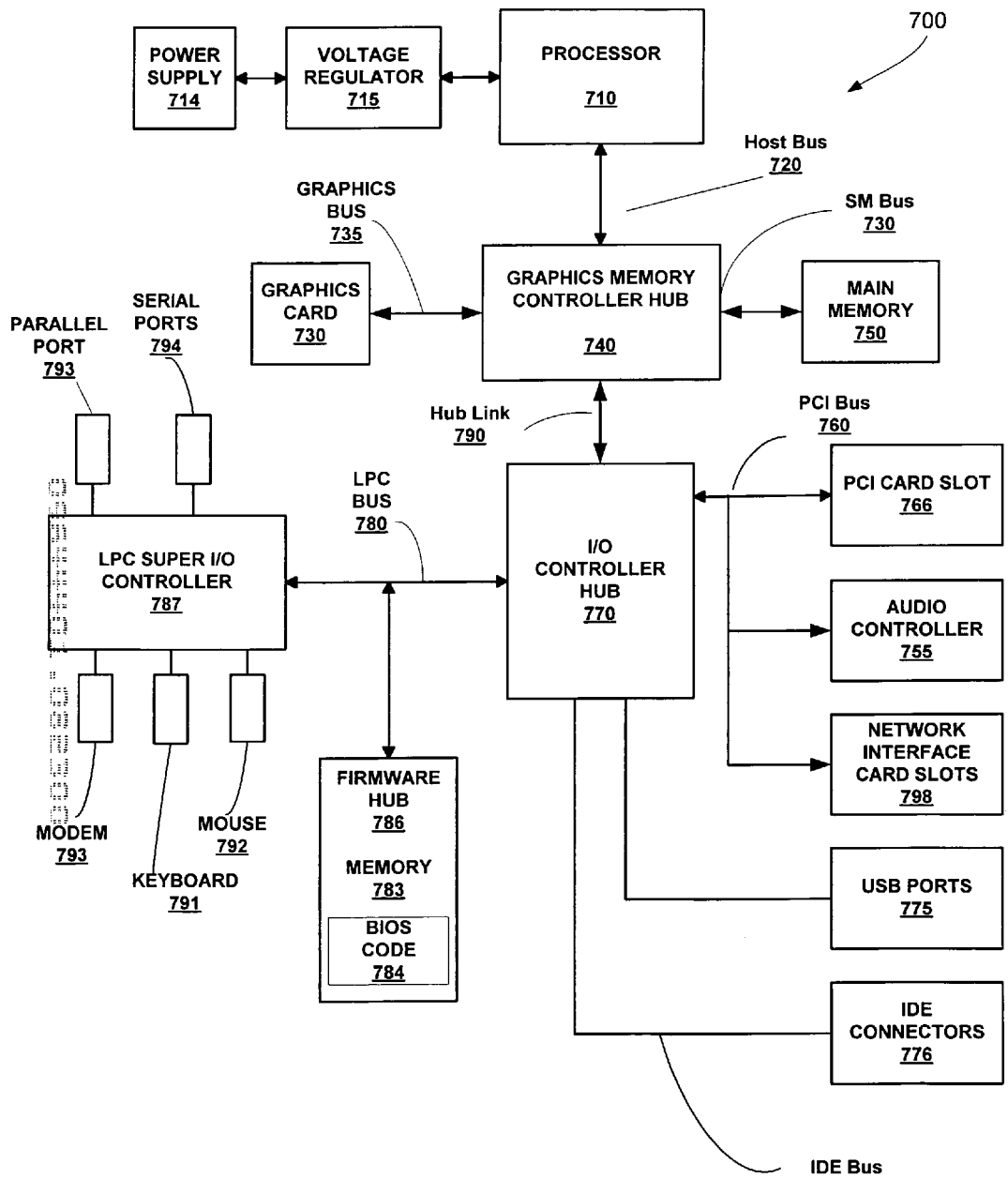
FIG. 7 is a block diagram of a typical computer system with which the present embodiments may be used.

FIG. 7 is a block diagram of an exemplary computer system 700 that may be found in many forms, including, for example, mainframes, minicomputers, workstations, servers, personal computers, internet terminals, notebooks, and embedded systems. Personal computer ("PC") systems, such as those compatible with the x86 configuration, include desktop, floor standing, or portable versions. A typical PC system 700 is a microcomputer that includes a microprocessor (or simply "processor") 710, associated main memory 750 and control logic and a number of peripheral devices that provide I/O for the system 700. A typical PC computer system 700 is powered by a power supply 714 with voltage regulator 715. The peripheral devices often include keyboards 791, mouse-type input devices 792, modems 793, and other traditional I/O devices (not shown) that may include display monitors, floppy and hard disk drives, CD-ROM drives, and printers. The number of I/O devices being added to personal computer systems continues to grow. For example, many computer systems also include terminal devices, televisions, sound devices, voice recognition devices, electronic pen devices, and mass storage devices such as tape drives, CD-ROM drives or DVDs. The peripheral devices usually communicate with the processor over one or more PCI slots 766, Audio Controller 755, Network Interface card slots 798, USB ports 775, or IDE connectors 776. The PCI slots 766 may use a PCI controller (not shown) to connect to one or more buses such as host bus 720, PCI bus 760, and LPC bus 780, with the buses communicating with each other through the use of one or more hubs such as graphics controller memory hub 740 and I/O controller hub 770. The USB ports 775 and IDE connectors 776 may connect to one or more of the hubs 740, 770. The hubs may communicate with each other through the use of one or more links such as hub link 790. Many I/O devices can also be accommodated by parallel ports 793 and serial ports 794 that are coupled to a LPC Super I/O controller 787 that is in turn coupled to a LPC bus 780. Typical computer systems often include a graphics card 730 coupled to a graphics memory controller hub 740 by a graphics bus 735 and a main memory 750 coupled to a graphics memory controller hub 740 by a SM bus 730. Finally, a typical computer system also includes software modules known as the BASIC Input/Output System (BIOS). The BIOS code 784 is stored on the firmware hub 786 in memory 783.

The present disclosure may be used with the typical computer system 700. The software programs referred to (including the configuration and operation software for the broadband modem, service provider and ISP provider and the capability qualification and broadband service package offering software) may be stored in main memory 750, other memory not shown, or downloaded through or accessed via one of the various I/O connections or ports or a peripheral device such as a CD-ROM device, hard disk drive or floppy disk device. Modems 793 may be an analog or V.90 modem or other such narrowband communication link. In addition, modems 793 may include a factory installed DSL modem or other such broadband communication link.

One skilled in the art will recognize that the foregoing components and devices are used as examples for the sake of conceptual clarity and that various configuration modifications are common. Consequently, as used herein the specific exemplars set forth in FIG. 7 are intended to be representative of their more general classes. In general, use of any specific exemplar herein is also intended to be representative of its class, and the non-inclusion of such specific devices in the foregoing list should not be taken as indicating that limitation is desired.

In alternative embodiments of the present disclosure, the DSL modem or other broadband communication link technology may be factory installed in the consumer's computer in addition to the narrowband technology such as an analog or V.90 modem. This will eliminate the need for a shipment of the DSL modem to the consumer and its installation.

In another embodiment of the present disclosure, the various software programs used to configure and enable broadband and ISP service are factory installed on the consumer's computer. In this way, additional time due to download for the installation and configuration software is eliminated.

In another embodiment of the present disclosure, the consumer accesses a website to download the necessary software applications. In addition, the capability qualification software may be launched from the website, automatically disconnect the consumer from the Internet, and dial a local or toll free number to perform the telephone line qualification check. This gives the consumer access to the most recent versions of software applications.

Also, while particular embodiments of the present disclosure have been shown and described, it will be obvious to those skilled in the art that changes and modifications may be made without departing from this disclosure in its broader aspects and, therefore, the appended claims are to encompass within their scope all such changes and modifications as fall within the true spirit and scope of this disclosure including but not limited to implementations of other broadband communication technologies, including DSL as described.

What is claimed is:

1. A method of upgrading a computer system from a narrowband communication link to a broadband communication link comprising: executing an application on a customer purchased computer system for performing a capability qualification operating over a standard phone line between a customer and a telephone company utilizing a customer's existing analog modem to determine availability of digital subscriber line (DSL) service over the same standard phone line using a combination modem coupled to the customer purchased computer system, wherein the combination modem includes DSL capability and standard phone line capability, wherein the capability qualification includes a test for impediments on the phone line and checks for quality of the phone line due to proximity between the customer and the telephone company, wherein the test for impediments sends one or more test patterns from the telephone company to the customer's existing analog modem; the customer purchased computer system offering to a user one or more DSL service packages upon confirmation that DSL service is available; and in response to a user selection enabling DSL capability of the combination modem coupled to the customer purchased computer system; wherein offering to a user one or more DSL service packages upon confirmation that DSL service is available comprises: providing information on the cost and features of the one or more DSL service packages on the customer purchased computer system; obtaining payment information; and downloading configuration and operation software for DSL and Internet service provider (ISP) services to the customer purchased computer system over the standard phone line.

2. A method, as recited in claim 1, wherein enabling DSL capability comprises:
    installing DSL service software and ISP service software on the customer purchased computer system;
    configuring DSL service software and ISP service software on the customer purchased computer system; and
    enabling DSL service software and ISP service software on the customer purchased computer system.

3. A method, as recited in claim 2, wherein enabling the DSL capability further comprises:
    the customer purchased computer system performing a self diagnostic test; and
    launching an Internet browser on the customer purchased computer system.

4. A method, as recited in claim 1, wherein enabling the DSL capability comprises instructing a telephone company to connect an existing telephone line to a digital network.

5. A method, as recited in claim 1, wherein enabling the DSL capability comprises downloading DSL service operation and configuration software to the customer purchased computer system over the standard phone line.

6. A computer system comprising: an application, executed on a customer purchased computer system, including a capability qualification unit for determining, over a standard phone line between a customer and a telephone company utilizing a customer's existing analog modem, the capability of the same standard phone line to support digital subscriber line (DSL) capability, wherein the capability qualification includes a test for impediments on the phone line and checks for quality of the phone line due to proximity between the customer and the telephone company, wherein the test for impediments sends one or more test patterns from the telephone company to the customer's existing analog modem; a service package offer unit for offering one or more DSL service packages to enable DSL capability on the customer purchased computer system; and another application including a DSL enable unit for enabling DSL capability of a combination modem coupled to the customer purchased computer system, wherein the DSL enable unit comprises: DSL service operation software downloaded to the customer purchased computer system over the standard phone line; and DSL service configuration software downloaded to the customer purchased computer system over the standard phone line.

7. A computer system, as recited in claim 6, wherein the DSL enable unit on the customer purchased computer system comprises an installation check unit for performing self diagnostic tests.

8. A computer system, as recited in claim 6 wherein the customer purchased computer system is upgraded from standard phone line capability to DSL capability via a web-based software application operated over the standard phone line.

9. An apparatus for upgrading a computer system from a narrowband communication link to a broadband communication link, the apparatus comprising:
    a combination modem coupled to a customer purchased computer system including a digital subscriber line (DSL) capability and a standard phone line capability;
    a computer readable medium; an application, executed on the customer purchased computer system, providing instructions stored on the computer readable medium to perform a capability qualification operating over a standard phone line between a customer and a telephone company utilizing a customer's existing analog modem to determine availability of DSL service over the same standard phone line, wherein the capability qualification includes a test for impediments on the phone line and checks for quality of the phone line due to proximity between the customer and the telephone company, wherein the test for impediments sends one or more test patterns from the telephone company to the customer's existing analog modem;
    instructions stored on the computer readable medium to offer one or more DSL service packages upon confirmation that DSL service is available; and
    another of the applications, executed on the customer purchased computer system, providing instructions stored on the computer readable medium to enable DSL capability of the combination modem coupled to the customer purchased computer system;
    wherein the instructions to offer one or more DSL service packages upon confirmation that DSL service is available comprises:
    instructions stored on the computer readable medium to provide information on the cost and features of the one or more DSL service packages on the customer purchased computer system;
    instructions stored on the computer readable medium to obtain payment information through the customer purchased computer system; and
    instructions stored on the computer readable medium to download configuration and operation software for DSL and internet service provider (ISP) services to the customer purchased computer system over the standard phone line.

10. The apparatus, as recited in claim 9, wherein the instructions to enable DSL capability comprise:
    instructions stored on the computer readable medium to install DSL service and ISP service software on the customer purchased computer system;
    instructions stored on the computer readable medium to configure DSL service software and ISP service software on the customer purchased computer system; and
    instructions stored on the computer readable medium to enable DSL service software and ISP service software on the customer purchased computer system.

11. The apparatus, as recited in claim 10, wherein the instructions to enable DSL capability further comprise:
- instructions stored on the computer readable medium to perform a self diagnostic test through the customer purchased computer system; and
- instructions stored on the computer readable medium to launch an Internet browser on the customer purchased computer system.

12. The apparatus, as recited in claim 9, wherein the instructions to enable DSL capability comprise instructions stored on the computer readable medium to instruct the telephone company to connect the existing telephone line to a digital network.

13. The apparatus, as recited in claim 9, wherein the instructions to enable DSL capability comprise instructions stored on the computer readable medium to download DSL service operation and configuration software to the customer purchased computer system over the standard phone line.

14. The apparatus, as recited in claim 9, wherein the instructions to upgrade the computer system from standard phone line capability to DSL capability are available for download to the customer purchased computer system from a website.

15. A computer system comprising at least one memory coupled to one or more processors, the at least one memory storing: a combination modem including a digital subscriber line (DSL) capability and a standard phone line capability on a customer purchased computer system; instructions from an application, executed on the customer purchased computer system, providing for performing a capability qualification operating over a standard phone line between a customer and a telephone company utilizing a customer's existing analog modem to determine the availability of DSL service over the same standard phone line, wherein the capability qualification includes a test for impediments on the phone line and checks for quality of the phone line due to proximity between the customer and the telephone company, wherein the test for impediments sends one or more test patterns from the telephone company to the customer's existing analog modem; instructions for offering one or more DSL service packages through the customer purchased computer system upon confirmation that DSL service is available; and instructions from another of the applications, executed on the customer purchased computer system, providing for enabling DSL capability on the customer purchased computer system; wherein the instructions for offering to a user one or more DSL service packages upon confirmation that DSL service is available comprises: instructions for providing information on the cost and features of the one or more DSL service packages on the customer purchased computer system; instructions for obtaining payment information on the customer purchased computer system; and instructions for downloading configuration and operation software for DSL and internet service provider (ISP) services to the customer purchased computer system over the standard phone line.

16. The computer system comprising at least one memory coupled to one or more processors, as recited in claim 15, wherein the instructions for enabling DSL capability comprises:
- instructions for installing DSL service software and ISP service software on the customer purchased computer system;
- instructions for configuring DSL service software and ISP service software on the customer purchased computer system; and
- instructions for enabling DSL service software and ISP service software on the customer purchased computer system.

17. The computer system comprising at least one memory coupled to one or more processors, as recited in claim 16, wherein the instructions for enabling DSL capability further comprises:
- instructions for performing a self diagnostic test through the customer purchased computer system; and
- instructions for launching an Internet browser on the customer purchased computer system.

18. The computer system comprising at least one memory coupled to one or more processors, as recited in claim 15, wherein instructions for enabling DSL capability on the customer purchased computer system comprises instructions for instructing the telephone company to connect the existing telephone line to a digital network.

19. The method of claim 1, wherein performing the capability qualification further comprises:
- using the customer purchased computer system to determine if DSL service is available from a specified service provider.

20. The computer system of claim 6, wherein the capability qualification unit further comprises:
- a check provider unit on the customer purchased computer system for determining if DSL service is available from a specified service provider.

21. The apparatus of claim 9, wherein the instructions stored on the computer readable medium to perform the capability qualification further comprises:
- instructions to determine if DSL service is available from a specified service provider for the customer purchased computer system.

22. The computer system of claim 15, wherein the application providing for performing the capability qualification further comprises:
- instructions for determining if DSL service to the customer purchased computer system is available from a specified service provider.

* * * * *

UNITED STATES PATENT AND TRADEMARK OFFICE
CERTIFICATE OF CORRECTION

PATENT NO.        : 7,627,657 B1
APPLICATION NO.   : 09/644401
DATED             : December 1, 2009
INVENTOR(S)       : Sargologos It is certified that error appears in the above-identified patent and that said Letters Patent is hereby corrected as shown below:

Claim 1, Column 8, Line 66 to Column 9, Line 28, should read:

1. A method of upgrading a computer system from a narrowband communication link to a broadband communication link comprising:
    executing an application on a customer purchased computer system for performing a capability qualification operating over a standard phone line between a customer and a telephone company utilizing a customer's existing analog modem to determine availability of digital subscriber line (DSL) service over the same standard phone line using a combination modem coupled to the customer purchased computer system, wherein the combination modem includes DSL capability and standard phone line capability, wherein the capability qualification includes a test for impediments on the phone line and checks for quality of the phone line due to proximity between the customer and the telephone company, wherein the test for impediments sends one or more test patterns from the telephone company to the customer's existing analog modem;
    the customer purchased computer system offering to a user one or more DSL service packages upon confirmation that DSL service is available; and
    in response to a user selection enabling DSL capability of the combination modem coupled to the customer purchased computer system;
    wherein offering to a user one or more DSL service packages upon confirmation that DSL service is available comprises:
    providing information on the cost and features of the one or more DSL service packages on the customer purchased computer system;
    obtaining payment information; and
    downloading configuration and operation software for DSL and Internet service provider (ISP) services to the customer purchased computer system over the standard phone line.

Claim 6, Column 9, Line 50 to Column 10, Line 4, should read:

6. A computer system comprising:
    an application, executed on a customer purchased computer system, including a capability qualification unit for determining, over a standard phone line between a customer and a telephone company utilizing a customer's existing analog modem, the capability of the same standard phone line to support digital subscriber line (DSL) capability, wherein the capability qualification includes a test for impediments on the phone line and checks for quality of the phone line due to proximity between the customer and the telephone company, wherein the test for impediments sends one or more test patterns from the telephone company to the customer's existing analog modem;
    a service package offer unit for offering one or more DSL service packages to enable DSL capability on the customer purchased computer system; and
    another application including a DSL enable unit for enabling DSL capability of a combination modem coupled to the customer purchased computer system, wherein the DSL enable unit comprises:
    DSL service operation software downloaded to the customer purchased computer system over the standard phone line; and

CERTIFICATE OF CORRECTION (continued)
U.S. Pat. No. 7,627,657 B1

DSL service configuration software downloaded to the customer purchased computer system over the standard phone line.

Claim 15, Column 11, Line 24 to Column 12, Line 2, should read:

15. A computer system comprising at least one memory coupled to one or more processors, the at least one memory storing:
    a combination modem including a digital subscriber line (DSL) capability and a standard phone line capability on a customer purchased computer system;
    instructions from an application, executed on the customer purchased computer system, providing for performing a capability qualification operating over a standard phone line between a customer and a telephone company utilizing a customer's existing analog modem to determine the availability of DSL service over the same standard phone line, wherein the capability qualification includes a test for impediments on the phone line and checks for quality of the phone line due to proximity between the customer and the telephone company, wherein the test for impediments sends one or more test patterns from the telephone company to the customer's existing analog modem;
    instructions for offering one or more DSL service packages through the customer purchased computer system upon confirmation that DSL service is available; and
    instructions from another of the applications, executed on the customer purchased computer system, providing for enabling DSL capability on the customer purchased computer system;
    wherein the instructions for offering to a user one or more DSL service packages upon confirmation that DSL service is available comprises:
    instructions for providing information on the cost and features of the one or more DSL service packages on the customer purchased computer system;
    instructions for obtaining payment information on the customer purchased computer system; and instructions for downloading configuration and operation software for DSL and internet service provider (ISP) services to the customer purchased computer system over the standard phone line.

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,627,657 B1 | Page 1 of 1 |
| APPLICATION NO. | : 09/644401 | |
| DATED | : December 1, 2009 | |
| INVENTOR(S) | : Nicholas J. Sargologos | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1081 days.

Signed and Sealed this

Twenty-first Day of December, 2010

David J. Kappos
*Director of the United States Patent and Trademark Office*